United States Patent
He et al.

(10) Patent No.: US 12,530,039 B2
(45) Date of Patent: Jan. 20, 2026

(54) SYSTEMS AND METHODS FOR PROMOTING STABLE AIRCRAFT APPROACH CONDITIONS

(71) Applicant: HONEYWELL INTERNATIONAL INC., Charlotte, NC (US)

(72) Inventors: Gang He, Morris Plains, NJ (US); Rajesh Chaubey, Bangalore (IN); Chethan N, Bangalore (IN); Kaushik Kumar Dash, Bangalore (IN); Shivam Srivastava, Bangalore (IN); Slavomira Bartovicova, Brno (CZ)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 82 days.

(21) Appl. No.: 18/654,320

(22) Filed: May 3, 2024

(65) Prior Publication Data
US 2025/0291361 A1    Sep. 18, 2025

(30) Foreign Application Priority Data
Mar. 14, 2024 (IN) .............................. 202411018606

(51) Int. Cl.
| | | |
|---|---|---|
| B64D 43/00 | (2006.01) | |
| G05D 1/495 | (2024.01) | |
| G05D 1/654 | (2024.01) | |
| G05D 109/22 | (2024.01) | |

(52) U.S. Cl.
CPC .......... *G05D 1/6545* (2024.01); *B64D 43/00* (2013.01); *G05D 1/495* (2024.01); *G05D 2109/22* (2024.01)

(58) Field of Classification Search
CPC .. G05D 1/6545; G05D 1/495; G05D 2109/22; B64D 43/00
See application file for complete search history.

(56) References Cited

U.S. PATENT DOCUMENTS

| | | |
|---|---|---|
| 2016/0116917 A1 | 4/2016 | Bataillon et al. |
| 2016/0200448 A1 | 7/2016 | Scacchi et al. |
| 2016/0229554 A1 | 8/2016 | Kawalkar et al. |
| 2018/0273200 A1 | 9/2018 | De Villele et al. |
| 2019/0122569 A1 | 4/2019 | Villele et al. |
| 2021/0276728 A1 | 9/2021 | Mast et al. |
| 2022/0108620 A1 | 4/2022 | Bouda et al. |

FOREIGN PATENT DOCUMENTS

| | | |
|---|---|---|
| EP | 3296698 A2 | 3/2018 |
| EP | 3382672 A1 | 10/2018 |
| EP | 2654029 B1 | 4/2021 |

*Primary Examiner* — Mathew Franklin Gordon
(74) *Attorney, Agent, or Firm* — Ingrassia Fisher & Lorenz LLP.

(57) ABSTRACT

Systems and methods are provided for promoting stable aircraft approach conditions. The system comprises a display device that is onboard an aircraft and a controller in communication with the display device. The controller is configured to, by a processor: receive data that includes information relating to an action configured to stabilize an approach of the aircraft during landing thereof and a recommended timing of performing the action relative to a predetermined flight plan of the aircraft, and render a first visual element on the display device that is configured to display the action relative to the flight plan and dynamically indicate the recommended timing of performing the action relative to a geographic position of the aircraft along the flight plan.

20 Claims, 5 Drawing Sheets

SYSTEMS AND METHODS FOR PROMOTING STABLE AIRCRAFT APPROACH CONDITIONS

CROSS-REFERENCE TO RELATED APPLICATION

This application claims priority to India Provisional Patent Application No. 202411018606, filed Mar. 14, 2024, the entire content of which is incorporated by reference herein.

TECHNICAL FIELD

The present invention generally relates to aircraft systems, and more particularly relates to systems and methods for promoting stable aircraft approach conditions.

BACKGROUND

Various actions are performed by flight crew during aircraft approach and landing procedures such as deploying flaps, applying airbrakes, and deploying landing gear. Optimization of the timing of these types of actions promotes stable approach conditions which promotes safe landing and efficient fuel consumption. However, the timing of these actions depend on various conditions such as the specific aircraft, landing conditions, weather conditions, etc. Further, non-ideal conditions such as off nominal weather, operational, or ATC related variations may further complicate such optimization. Such non-ideal conditions may require deviation from standard operating procedures and/or may require the flight crew to initiate such actions under increased workload and/or stress conditions.

Hence, there is a need for systems and methods capable of efficiently and clearly indicating to flight crews when various actions are recommended to be performed to promote stable approach and landings of an aircraft. Furthermore, other desirable features and characteristics of the present invention will become apparent from the subsequent detailed description and the appended claims, taken in conjunction with the accompanying drawings and the foregoing technical field and background.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A system is provided for promoting stable aircraft approach conditions. The system comprises a display device that is onboard an aircraft and a controller in communication with the display device. The controller is configured to, by a processor: receive data that includes information relating to an action configured to stabilize an approach of the aircraft during landing thereof and a recommended timing of performing the action relative to a predetermined flight plan of the aircraft, and render a first visual element on the display device that is configured to display the action relative to the flight plan and dynamically indicate the recommended timing of performing the action relative to a geographic position of the aircraft along the flight plan.

A method is provided for promoting stable aircraft approach conditions. The method comprises, with a processor of a controller of an aircraft: receiving data that includes information relating to an action configured to stabilize an approach of the aircraft and a recommended timing of performing the action relative to a predetermined flight plan of the aircraft, and rendering a first visual element, on a display device onboard the aircraft, configured to display the action relative to the flight plan and dynamically indicate the recommended timing of performing the action relative to a geographic position of the aircraft along the flight plan.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

Figure 1:
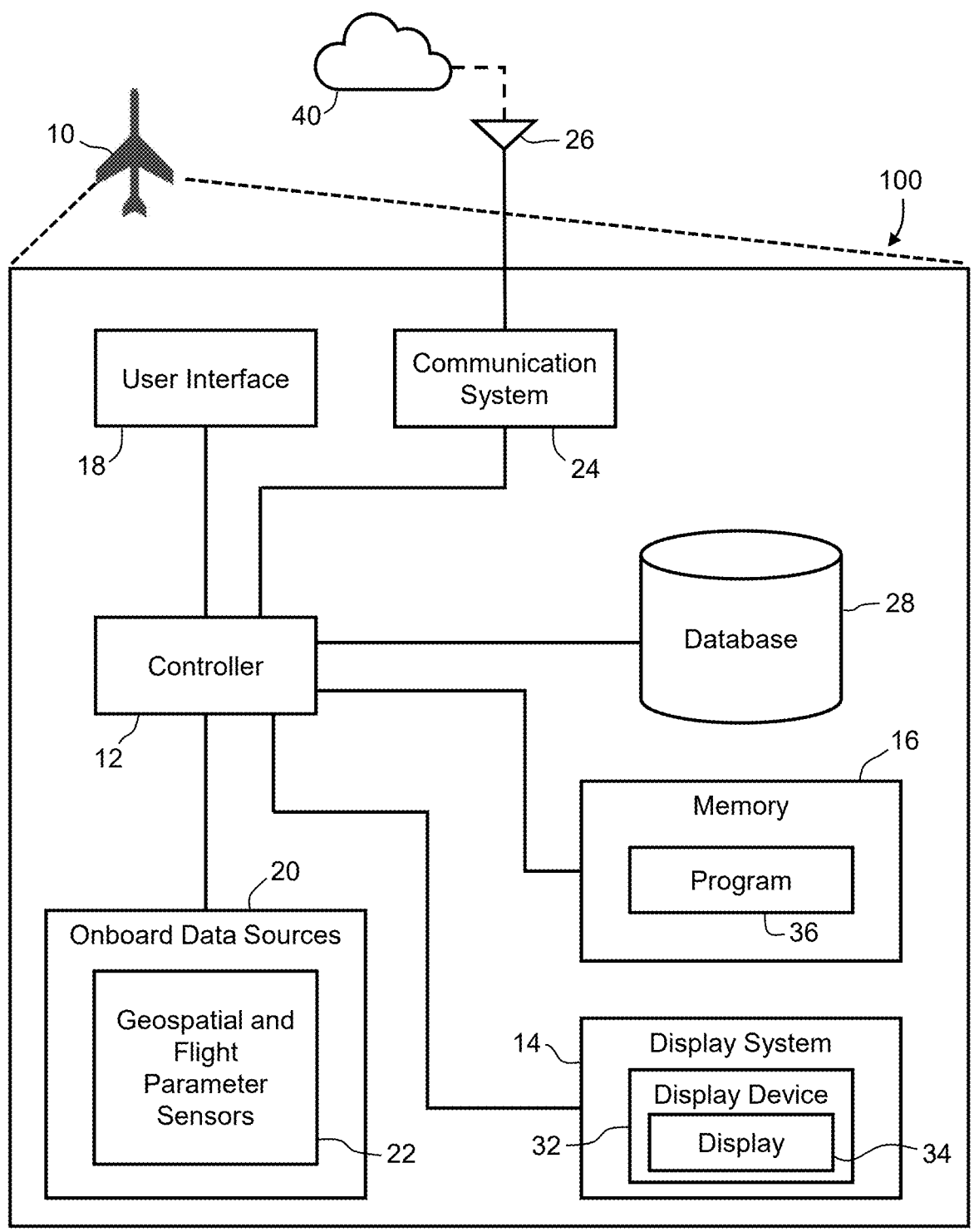
FIG. 1 is a block diagram representing an exemplary aircraft having an energy state cue system for promoting stable approach conditions during aircraft approach and/or landing in accordance with an embodiment.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Systems and methods disclosed herein provide for efficiently and clearly indicating when various actions are recommended to be performed to promote stable approaches and landings of an aircraft. It should be noted that the term aircraft, as utilized herein, may include any manned or unmanned object capable of flight. Examples of aircraft may include, but are not limited to, fixed-wing aerial vehicles (e.g., propeller-powered or jet powered), rotary-wing aerial vehicles (e.g., helicopters), manned aircraft, unmanned aircraft (e.g., unmanned aerial vehicles, or UAVs), delivery drones, etc. For convenience, the systems and methods will be described in reference to a manned airplane; however, as noted the systems and methods are not limited to such application.

The systems may be configured to determine recommended timing of performing one or more actions to promote the stabile approach of the aircraft, visually display the actions and their corresponding recommended timing relative to a position of the aircraft along a flight plan thereof, and perform actions relating to verification that the actions are timely performed. The systems may dynamically determine and update the timing of the actions based on an energy state of the aircraft.

In general, various aircraft parameters can be used to determine the current and forward projected energy state relative to the desired approach and landing conditions. These parameters include airspeed of the aircraft (kinetic energy), altitude of the aircraft (potential energy), gross weight, distance to the intended approach and landing stability decision point. The term energy state as used herein is defined by how much of each type of energy the aircraft has available at any given time. During the approach and landing procedures, maintaining an energy state within an optimal range promotes stability of the aircraft. Generally, the actions performed during approach and landing procedures relate to deploying systems of the aircraft, such as flaps, air brakes, landing gear, etc. (collectively referred to herein as drag devices) to increase a drag of the aircraft and thereby reduce the velocity of the aircraft and dissipate the energy state of the aircraft. The process of manipulating the energy state of the aircraft is referred to herein as energy management. Preferably, the systems perform energy management to not only promote a safe and stable approach, but also to promote efficient fuel consumption.

Referring now to FIG. 1, an aircraft 10, such as an airplane, and certain systems thereof are illustrated in accordance with an exemplary and non-limiting embodiment of the present disclosure. An energy state cue system 100 may be utilized onboard the aircraft 10 as described herein. As schematically depicted in FIG. 1, the system 100 includes and/or is functionally coupled to the following components or subsystems, each of which may assume the form of a single device or multiple interconnected devices, including, but not limited to, a controller 12 operationally coupled to: at least one display device 32, which may optionally be part of a larger on-board display system 14; computer-readable storage media or memory 16; an optional user interface 18, and ownship data sources 20 including, for example, an array of flight system status and geospatial sensors 22. The system 100 may be separate from or integrated within a flight management system (FMS) and/or a flight control system (FCS). The system 100 may also contain a communication system 24 including an antenna 26, which may wirelessly transmit data to and receive data from various sources external to the system 100.

Figure 2:
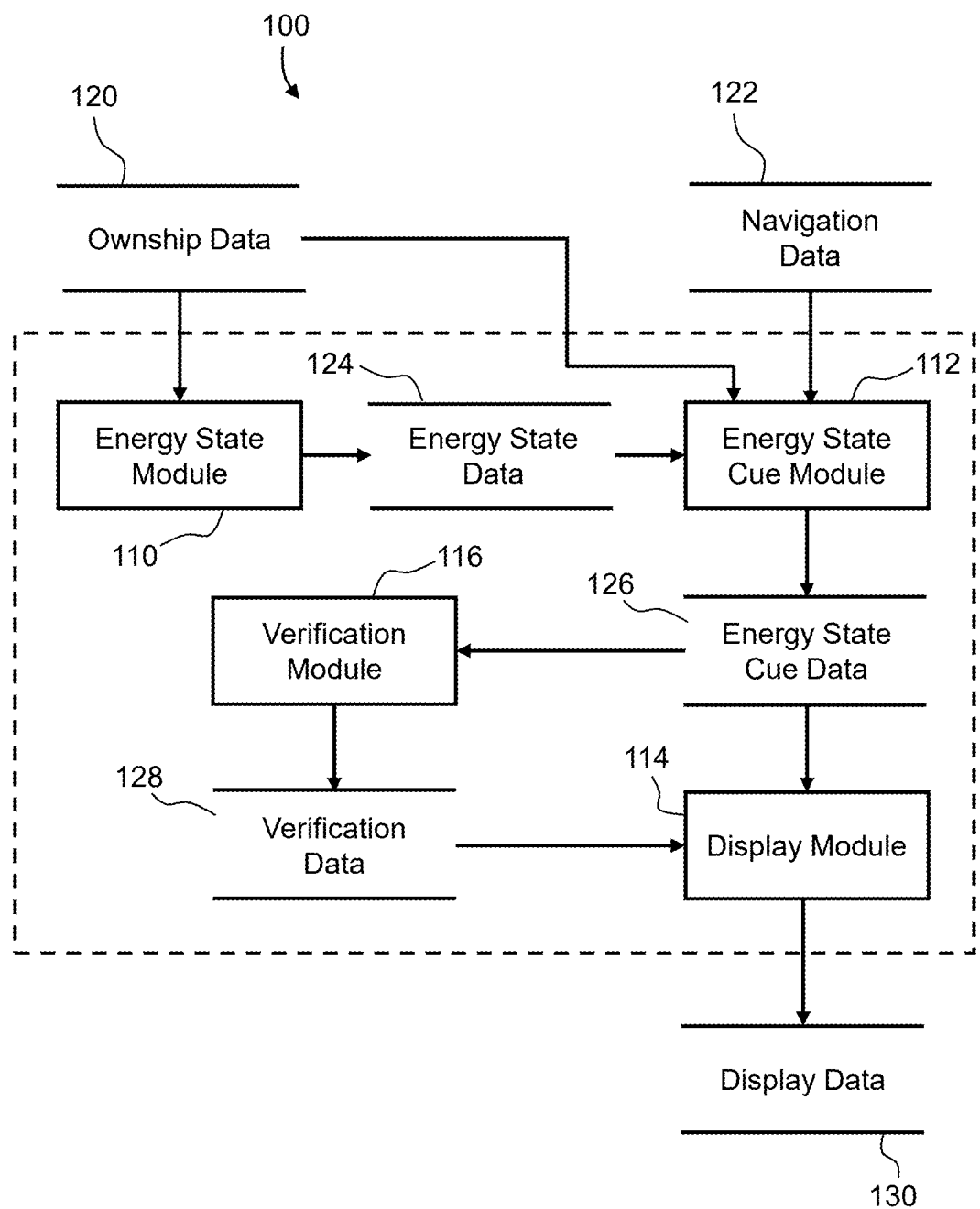
FIG. 2 is a dataflow diagram illustrating operation of the energy state cue system of FIG. 1 in accordance with an embodiment.

Although schematically illustrated in FIG. 2 as a single unit, the individual elements and components of the system 100 can be implemented in a distributed manner utilizing any practical number of physically distinct and operatively interconnected pieces of hardware or equipment. When the system 100 is utilized as described herein, the various components of the system 100 will typically all be located onboard the aircraft 10.

The term "controller," as appearing herein, broadly encompasses those components utilized to carry-out or otherwise support the processing functionalities of the system 100. Accordingly, the controller 12 can encompass or may be associated with any number of individual processors, flight control computers, navigational equipment pieces, computer-readable memories (including or in addition to the memory 16), power supplies, storage devices, interface cards, and other standardized components.

In various embodiments, the controller 12 includes at least one processor, a communication bus, and a computer readable storage device or media. The processor performs the computation and control functions of the controller 12. The processor can be any custom made or commercially available processor, a central processing unit (CPU), a graphics processing unit (GPU), an auxiliary processor among several processors associated with the controller 12, a semiconductor-based microprocessor (in the form of a microchip or chip set), any combination thereof, or generally any device for executing instructions. The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 12. The bus serves to transmit programs, data, status and other information or signals between the various components of the aircraft 10. The bus can be any suitable physical or logical means of connecting computer systems and components. This includes, but is not limited to, direct hard-wired connections, fiber optics, infrared, and wireless bus technologies.

The instructions may include one or more separate programs, each of which comprises an ordered listing of executable instructions for implementing logical functions. The instructions, when executed by the processor, receive and process signals from the sensors 22, perform logic, calculations, methods and/or algorithms, and generate data based on the logic, calculations, methods, and/or algorithms. Although only one controller 12 is shown in FIG. 1, embodiments of the aircraft 10 can include any number of controllers 12 that communicate over any suitable communication medium or a combination of communication mediums and that cooperate to process the sensor signals, perform logic, calculations, methods, and/or algorithms, and generate data. In various embodiments, the controller 12 includes or cooperates with at least one firmware and software program (generally, computer-readable instructions that embody an algorithm) for carrying-out the various process tasks, calculations, and control/display functions described herein. During operation, the controller 12 may be programmed with and execute at least one firmware or software program, for example, a program 36, that embodies one or more algorithms, to thereby perform the various process steps, tasks, calculations, and control/display functions described herein.

The controller 12 may exchange data with one or more external sources 40 to support operation of the system 100 in various embodiments. In this case, bidirectional wireless data exchange may occur via the communication system 24 over a communications network, such as a public or private network implemented in accordance with Transmission Control Protocol/Internet Protocol architectures or other conventional protocol standards. Encryption and mutual authentication techniques may be applied, as appropriate, to ensure data security.

In various embodiments, the communication system 24 is configured to support instantaneous (i.e., real time or current) communications between on-board systems, the controller 12, and one or more external data source(s) 40. The communication system 24 may incorporate one or more transmitters, receivers, and the supporting communications hardware and software required for components of the system 100 to communicate as described herein. In various embodiments, the communication system 24 may have additional communications not directly relied upon herein, such as bidirectional pilot-to-ATC (air traffic control) communications via a datalink, and any other suitable radio communication system that supports communications between the aircraft 10 and various external source(s).

The memory 16 can encompass any number and type of storage media suitable for storing computer-readable code or instructions, such as the program 36, as well as other data generally supporting the operation of the system 100. As can be appreciated, the memory 16 may be part of the controller 12, separate from the controller 12, or part of the controller 12 and part of a separate system. The memory 16 can be any suitable type of storage apparatus, including various different types of direct access storage and/or other memory devices.

A source of information suitable for determining and recommending actions during an aircraft approach and/or land may be part of the system 100. In certain embodiments, the source is one or more databases 28 employed to receive and store map data, which may be updated on a periodic or iterative basis to ensure data timeliness. In various embodiments, the map data may include various terrain and man-made object locations and elevations and may be stored in the memory 16 or in the one or more databases 28, and referenced by the program 36. In various embodiments, these databases 28 may be available online and accessible remotely by a suitable wireless communication system, such as the communication system 24.

The sensors 22 supplies various types of data and/or measurements to the controller 12. In various embodiments, the sensors 22 supplies, without limitation, one or more of: inertial reference system measurements providing a location, Flight Path Angle (FPA) measurements, airspeed data, groundspeed data, vertical speed data, vertical acceleration data, altitude data, attitude data including pitch data and roll measurements, yaw data, data related to ownship weight, time/date information, heading information, data related to atmospheric conditions, flight path data, flight track data, radar altitude data, geometric altitude data, wind speed and direction data. Further, in certain embodiments of the system 100, the controller 12, and the other components of the system 100 may be included within or cooperate with any number and type of systems commonly deployed onboard aircraft including, for example, an FMS, an Attitude Heading Reference System (AHRS), an Instrument Landing System (ILS), and/or an Inertial Reference System (IRS).

With continued reference to FIG. 1, the display device 32 can include any number and type of image generating devices on which one or more avionic displays 34 may be produced. In various embodiments, the display device 32 may be affixed to the static structure of the aircraft 10 cockpit as, for example, a Head Down Display (HDD) or Head Up Display (HUD) unit. Alternatively, the display device 32 may assume the form of a movable display device (e.g., a pilot-worn display device) or a portable display device, such as an Electronic Flight Bag (EFB), a laptop, or a tablet computer carried into the aircraft 10 cockpit by a pilot.

At least one avionic display 34 is generated on display device 32 during operation of the system 100. The term "avionic display" as used herein is synonymous with the terms "aircraft-related display" and "cockpit display" and encompasses displays generated in textual, graphical, cartographical, and other formats. The system 100 can generate various types of lateral and vertical avionic displays 34 on which symbology, text annunciations, and other graphics pertaining to flight planning are presented for a pilot to view. The display device 32 is configured to continuously render at least one avionic display 34 showing a terrain environment at a current location of the aircraft 10. The avionic display 34 generated and controlled by the system 100 can include alphanumerical input displays of the type commonly presented on the screens of multi-function control and display units (MCDUs), as well as Control Display Units (CDUs) generally. Specifically, certain embodiments of the avionic displays 34 include one or more two dimensional (2D) avionic displays, such as a horizontal (i.e., lateral) navigation display or vertical navigation display; and/or on one or more three dimensional (3D) avionic displays, such as a Primary Flight Display (PFD) or an exocentric 3D avionic display.

In various embodiments, a human-machine interface, such a touch screen display, is implemented as an integration of the user interface 18 and the display device 32. Via various display and graphics systems processes, the controller 12 may command and control the touch screen display generating a variety of graphical user interface (GUI) objects or elements, for example, buttons, sliders, and the like, which are used to prompt a user to interact with the human-machine interface to provide user input, and to activate respective functions and provide user feedback, responsive to received user input at the GUI element.

With reference to FIG. 2 and with continued reference to FIG. 1, a dataflow diagram illustrates elements of the system 100 of FIG. 1 in accordance with various embodiments. As can be appreciated, various embodiments of the system 100 according to the present disclosure may include any number of modules embedded within the controller 12 which may be combined and/or further partitioned to similarly implement systems and methods described herein. Furthermore, inputs to the system 100 may be received from other control modules (not shown) associated with the aircraft 10, and/or determined/modeled by other sub-modules (not shown) within the controller 12. Furthermore, the inputs might also be subjected to preprocessing, such as sub-sampling, noise-reduction, normalization, feature-extraction, missing data reduction, and the like. In various embodiments, the system 100 includes an energy state module 110, an energy state cue module 112, a display module 114, and a verification module 116.

In various embodiments, the energy state module 110 receives as input ownship data 120 generated by the sensors 22. The ownship data 120 includes various data indicating a geographical position of the aircraft 10, operating parameters of the aircraft 10 (e.g., velocity, altitude, etc.), and statuses of certain systems of the aircraft 10 (e.g., whether drag devices are deployed).

The energy state module 110 performs an analysis of the ownship data 120 to determine an energy state of the aircraft 10. The energy state module 110 generates energy state data 124 that includes various data indicating the determined energy state of the aircraft 10.

In various embodiments, the energy state cue module 112 receives as input the energy state data 124 generated by the energy state module 110, the ownship data 120, and navigation data 122 generated by the sensors 22, retrieved from the database 28, received from the external data source(s) 40 via the communication system 24, or input by the flight crew via the user interface 18. The navigation data 122 includes various data indicating a flight plan of the aircraft 10, relevant weather conditions, and the like.

The energy state cue module 112 determines recommended timing for performance of one or more approach and/or landing actions to be performed based on a comparison of the energy state of the aircraft 10, the position of the aircraft 10, and the flight plan of the aircraft 10. As noted previously, the recommended timing of the actions are configured to maintain the aircraft 10 in a stable approach and/or landing. The energy state cue module 112 generates energy state cue data 126 including various data indicating the action(s) and recommended timing corresponding to each of the action(s), and the statuses of various systems of the aircraft 10.

In various embodiments, the display module 114 receives as input the energy state cue data 126 generated by the energy state cue module 112. The display module 114 generates display data 130 that includes various data configured to cause one or more graphic icons (i.e., energy state cues) to be rendered on the display device 32 that visually indicates the recommended action(s) and the corresponding timing of each of the action(s).

In various embodiments, the verification module 116 receives as input the energy state cue data 126 generated by the energy state cue module 112. The verification module 116 determines whether each recommended action has been performed. If one or more of the actions have not been performed, the verification module 116 compares the recommended timing of the remaining actions with the current position of the aircraft 10. The verification module 116 may generate verification data 128 that includes various data including information that indicates the status of the action(s) and whether any of the action(s) are upcoming, imminent, and/or overdue, for example, based on preprogrammed criteria.

In various embodiments, the display module 114 receives as input the verification data 128 generated by the verification module 116. The display module 114 generates the display data 130 that, in this instance, may include data configured to cause one or more graphic icons to be rendered or modified on the display device 32 that visually indicates whether the action was performed and/or a notification, alert, or warning for the flight crew. For example, the display data 130 may be configured to initiate the rendering of a visual element on the display device 32 to alert the crew when the timing of the action relative to the position of the aircraft 10 along the flight plan meets conditions of a preprogrammed first threshold (e.g., less than a preprogramed distance or time remaining), or to warn the crew when the timing of the action relative to the position of the aircraft 10 along the flight plan meets conditions of a preprogrammed second threshold that is different that the first threshold (e.g., the action is overdue).

Figure 3:
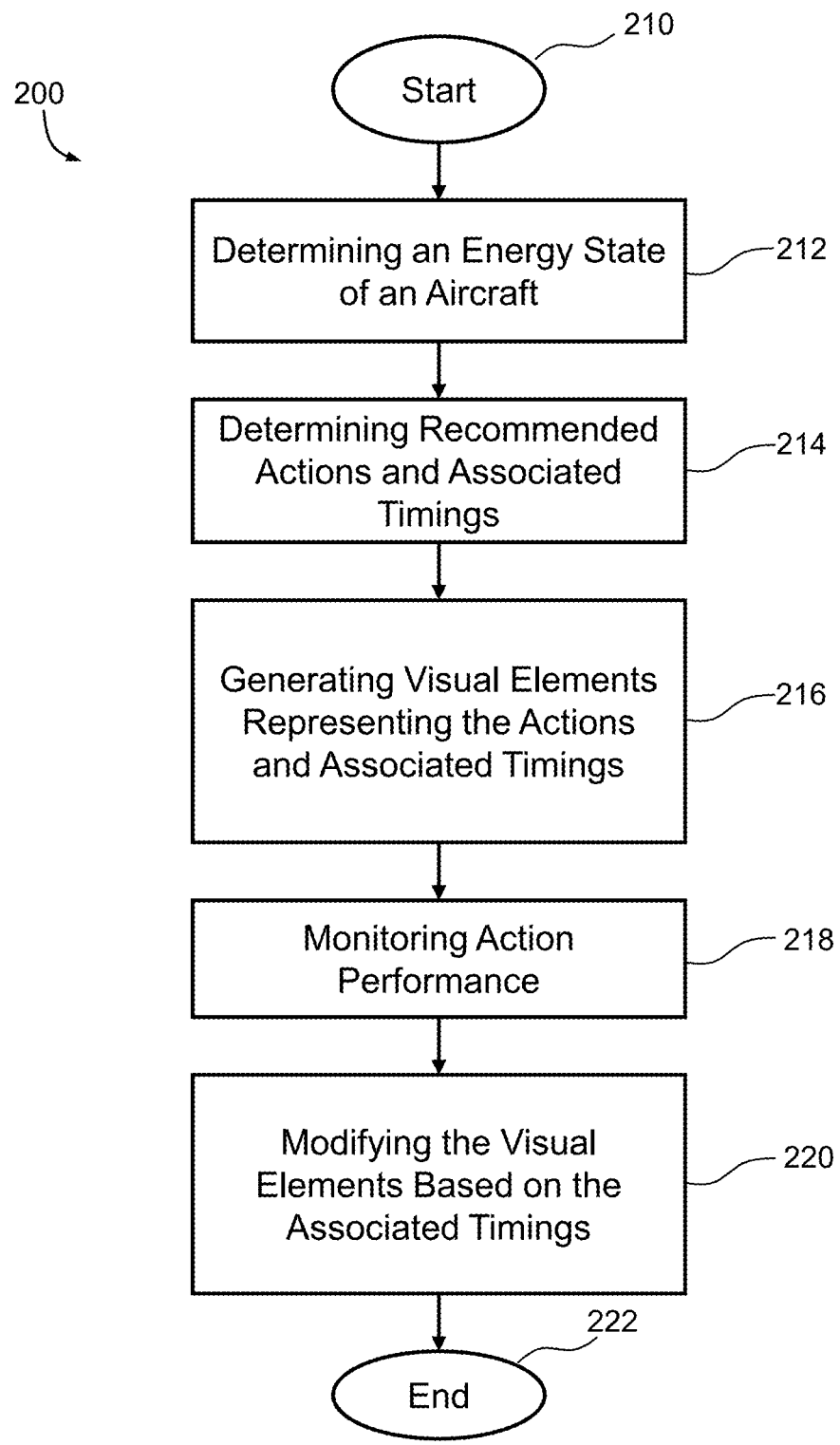
FIG. 3 is a flowchart illustrating an exemplary method for providing energy state cues in accordance with an embodiment.

The systems disclosed herein, including the system 100, provide for methods of determining when various actions are recommended to be performed to promote stable approach and landings of an aircraft. For example, FIG. 3 is a flow chart illustrating an exemplary method 200. The method 200 may start at 210. At 212, the method 200 may include determining an energy state of the aircraft 10 based on, for example, data received from the sensors 22 and/or other components of the aircraft 10. At 214, the method 200 may include determining actions and associated recommended timings for performance of the actions. The actions may be determined based on, for example, a comparison of the energy state of the aircraft 10, the position of the aircraft 10, and the flight plan of the aircraft 10. In various embodiments, the method 200 may include rendering a visual element on the display device 32 that is configured to indicate a stability status of the aircraft 10.

At 216, the method 200 may include generating visual elements representing the actions and associated timings. At 218, the method 200 may include monitoring the action performance including, for example, determining whether the actions have been performed (e.g., have the flaps been deployed) and determining whether the associated timings are upcoming, imminent, overdue, or the like (e.g., exceed a threshold). At 220, the method 200 may include modifying one or more of the visual elements or generating other visual elements based on the associated timings, for example, to indicate (e.g., via color change, flashing, etc.) that an action is upcoming, imminent, overdue, or the like. The method 200 may end at 222.

Figure 4:
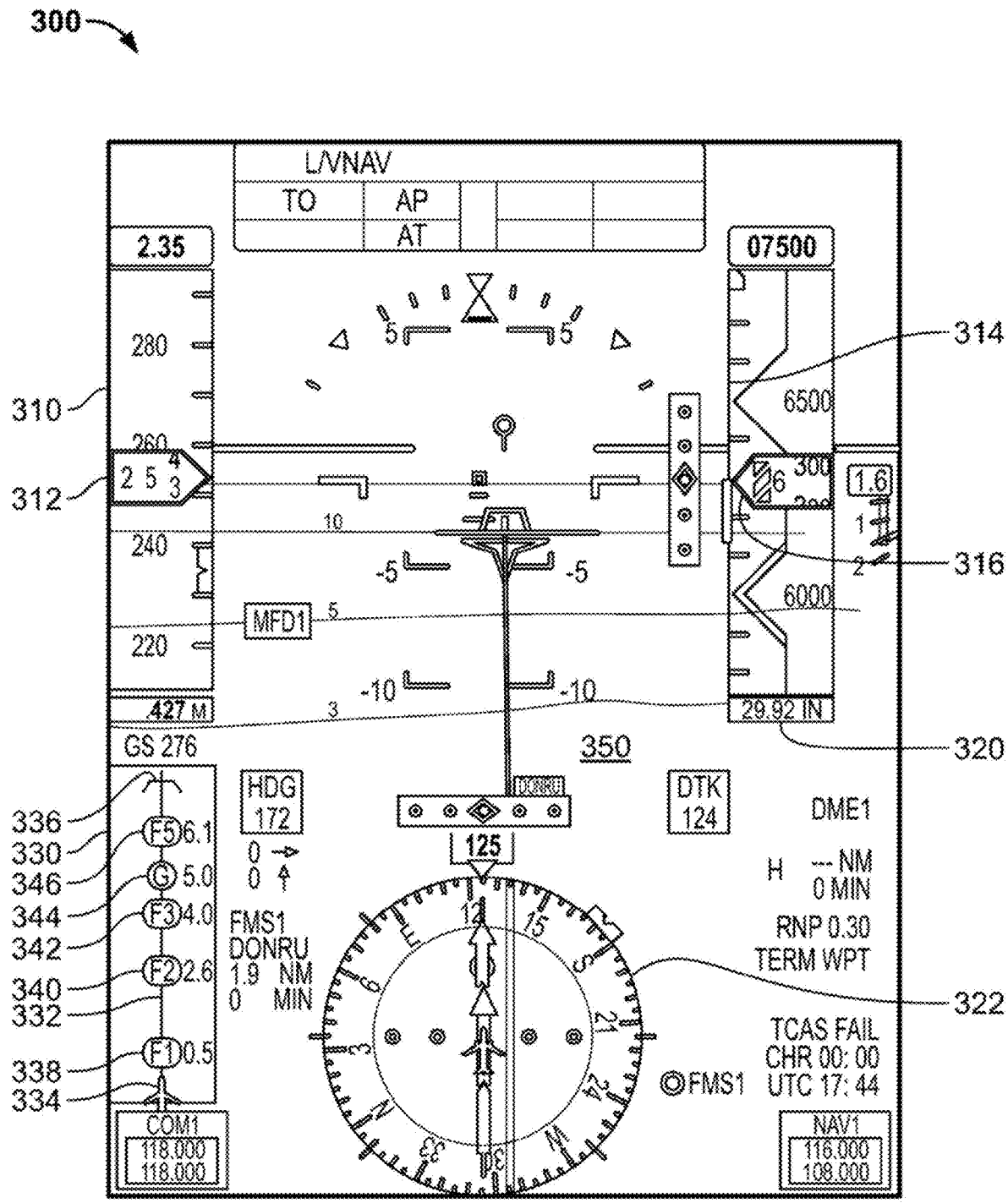
FIGS. 4 and 5 are avionics displays including visual icons representing actions to be performed during an aircraft approach and corresponding timings thereof in accordance with an embodiment.
Figure 5:
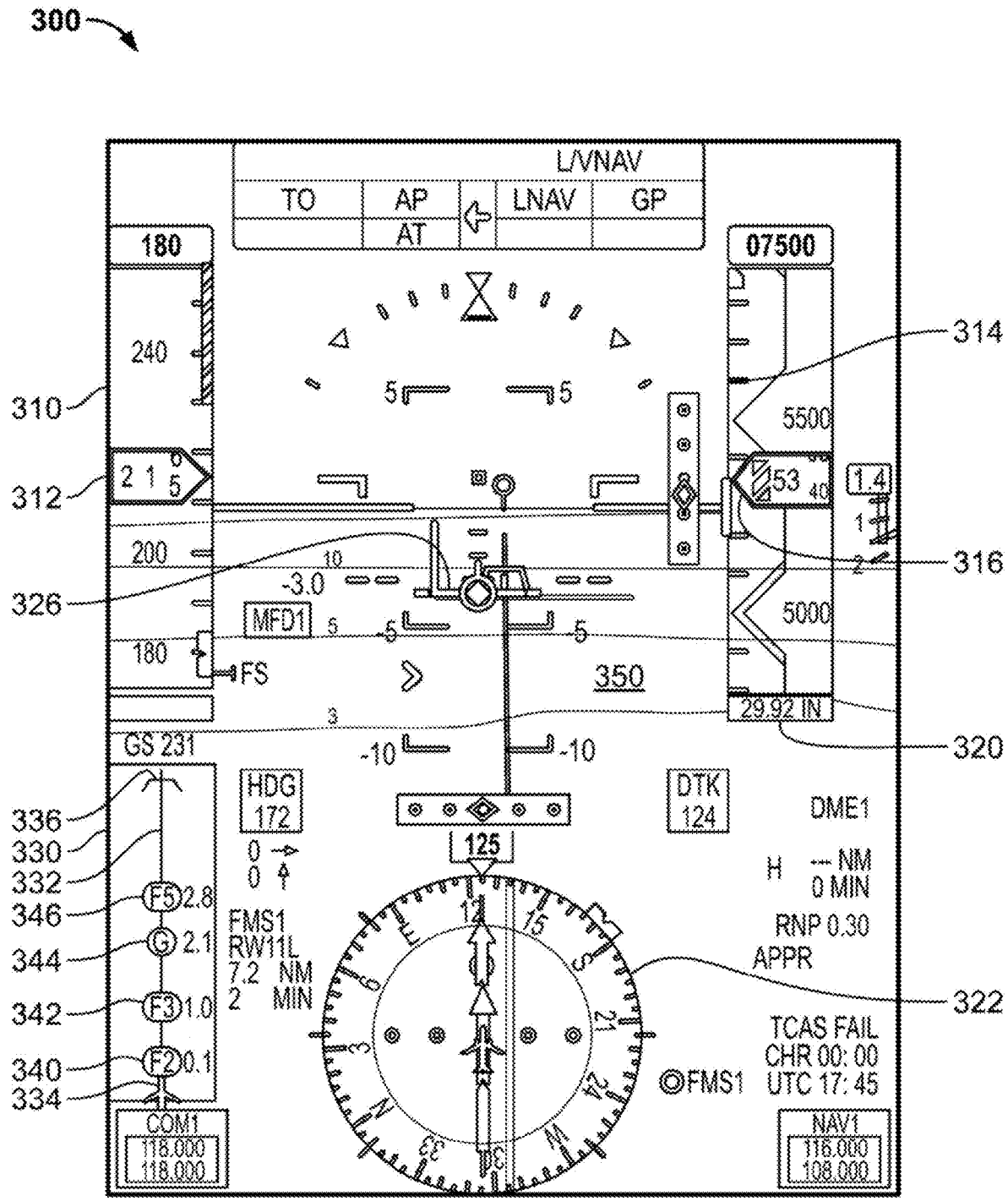

FIGS. 4 and 5 present a nonlimiting example of the avionic display 34, referred to herein as a primary flight display (PFD) 300, generated on the display device 32. The PFD 300 includes various graphical elements including, but not limited to, a compass 322; an airspeed indicator or "airspeed tape" 310, which features a precision readout window 312; an altitude indicator or "altitude tape" 314, which features a precision readout window 316; a barometric pressure setting readout 320 (located beneath the altitude tape 314); and a flight path vector graphic or flight path marker (FPM) 326, which moves across the PFD 300 to reflect changes in the flight path of the aircraft 10.

The PFD 300 is a perspective view Synthetic Vision System (SVS) display including graphical renderings of terrain and other geographical features representing the view from the cockpit under ideal visibility conditions (a so-called "glass cockpit" view). The simulated "glass cockpit" view produced on the PFD 300 thus includes an environmental graphic 350, which represents a first-person view of a real terrain environment which the aircraft 10 is presently approaching (typically oriented in or limited to a forward field of view relative to the aircraft 10).

Additionally, the PFD 300 includes a dynamic visual element 330 configured to promote stable approaches and landings of an aircraft. The visual element 330, also referred to herein as the energy management icon 330, may be rendered on the PFD 300 during an approach procedure. In the exemplary embodiment shown in FIGS. 4 and 5, the energy management icon 330 includes a rectangular region that includes a flight plan icon 332 (e.g., a line) representing a portion of a flight plan between an ownship icon 334 representing a position of the aircraft 10 and a destination icon 336 representing an end of the flight plan or a relevant extent thereof.

In this example, the energy management icon 330 includes action icons 338-346 each representing an action recommended by the system 100. The location of the action icons 338-346 are located on the flight plan icon 332 and dynamically updated relative to the ownship icon 334 while the aircraft 10 travels along the flight plan. As represented, each of the action icons 338-346 may include a marking (in this instance text) indicating the corresponding action, for example, F1-F5 indicating deployment of various flaps, and G for deployment of landing gear. In addition to their individual positions along the flight plan icon 332, the action icons 338-346 may each be associated with a distance measurement icon (e.g., number adjacent to the action icons 338-346) indicating a flight distance between the aircraft 10 and the recommended timing of the action.

The action icons 338-346 may be modified (or other visual elements may be generated) to indicate various information relating to the actions and their corresponding timings. For example, in FIG. 4 the action associated with the action icon 338 ("F1") is within a distance threshold relative to the aircraft 10 and therefore the action icon 338 is rendered with a colored background. In contrast, the other actions associated with the action icons 340-346 ("F2," "F3," "G," and "F5") are outside of their respective distance thresholds and therefore the action icons 340-346 are rendered with white backgrounds. In this manner, the flight crew may easily determine that the action associated with the action icon 338 is upcoming, imminent, or the like. In FIG. 5, all of the remaining actions are within their respective distance thresholds. As such, the action icons 340-346 are rendered with a colored background. If one or more of the actions are overdue, their corresponding action icons 338-346 may be further modified, for example by flashing between white backgrounds and colored backgrounds. In addition, or as an alternative, over audible, visual, and/or vibrational alerts may be generated to indicate information relating to the timings of the actions. Energy management icon 330 may be implemented in various different formats and at various different positions on the display 300. For example, in FIG. 4 action icon 338 may be displayed at the top of airspeed tape 310 to highlight a pending or an immediate action for use of particular drag devices.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodi-

What is claimed is:

1. A system comprising:
a display device that is onboard an aircraft; and
a controller in communication with the display device, the controller configured to, by a processor:
receive data that includes information relating to an action configured to stabilize an approach of the aircraft and a recommended timing of performing the action relative to a predetermined flight plan of the aircraft; and
render a first visual element on the display device that is configured to display the action relative to the flight plan and dynamically indicate the recommended timing of performing the action relative to a geographic position of the aircraft along the flight plan.

2. The system of claim 1, wherein the controller is configured to, by the processor:
receive verification data that includes information indicating whether the action was performed; and
render a second visual element on the display device that is configured to indicate whether the action was performed or modify the first visual element to indicate whether the action was performed.

3. The system of claim 1, wherein the controller is configured to, by the processor:
monitor whether the action was performed; and
render a second visual element on the display device that is configured to indicate whether the action was performed or modify the first visual element to indicate whether the action was performed.

4. The system of claim 1, wherein the controller is configured to, by the processor:
render a second visual element on the display device that is configured to indicate a stability status of the aircraft.

5. The system of claim 1, wherein the controller is configured to, by the processor:
receive ownship data including sensed information relating to the operation of the aircraft; and
determine an energy state of the aircraft, wherein the recommended timing of performing the action is configured to maintain the energy state of the aircraft within a predetermined range.

6. The system of claim 1, further comprising:
a sensor system configured to sense an energy state of the aircraft during the landing thereof;
a navigation system configured to monitor a location of the aircraft along the flight plan of the aircraft;
wherein the controller is configured to, by the processor:
receive sensor data from the sensor system and navigation data from the navigation system; and
determine the action and recommended timing of performing the action is based on the sensor data and the navigation data.

7. The system of claim 1, wherein the controller is configured to, by the processor:
monitor the recommended timing of performing of the action relative to a position of the aircraft along the flight plan;
modify the first visual element in a first manner when the timing of performing the action relative to the position of the aircraft along the flight plan meets conditions of a preprogrammed first threshold; and
modify the first visual element in a second manner when the timing of performing the action relative to the position of the aircraft along the flight plan meets conditions of a preprogrammed second threshold that is different from the first threshold.

8. The system of claim 1, wherein the action includes increasing aerodynamic drag by deploying flaps, applying air brakes, or deploying landing gear of the aircraft.

9. The system of claim 1, wherein the data is received from a flight management system.

10. The system of claim 1, wherein the first visual element includes a flight plan icon representing of the flight plan, an ownship icon representing a position of the aircraft along the flight plan, and an action icon representing the action, wherein the action icon is located on the flight plan icon in a position relative to the ownship icon indicating the recommended timing of performing the action.

11. A method comprising:
receiving, with a processor of a controller of an aircraft, data that includes information relating to an action configured to stabilize an approach of the aircraft and a recommended timing of performing the action relative to a predetermined flight plan of the aircraft; and
rendering, by the processor, a first visual element, on a display device onboard the aircraft, configured to display the action relative to the flight plan and dynamically indicate the recommended timing of performing the action relative to a geographic position of the aircraft along the flight plan.

12. The method of claim 11, further comprising, by the processor:
receiving data that includes information indicating whether the action was performed; and
rendering a second visual element on the display device that is configured to indicate whether the action was performed or modify the first visual element to indicate whether the action was performed.

13. The method of claim 11, further comprising, by the processor:
monitoring whether the action was performed; and
rendering a second visual element on the display device that is configured to indicate whether the action was performed or modify the first visual element to indicate whether the action was performed.

14. The method of claim 11, further comprising, by the processor:
rendering a second visual element on the display device that is configured to indicate a stability status of the aircraft.

15. The method of claim 11, further comprising, by the processor:
receiving ownship data including sensed information relating to the operation of the aircraft; and
determining an energy state of the aircraft, wherein the recommended timing of performing the action is configured to maintain the energy state of the aircraft within a predetermined range.

16. The method of claim 11, further comprising:
sensing, with a sensor system of the aircraft, an energy state of the aircraft;
monitoring, with a navigation system of the aircraft, a location of the aircraft along the flight plan of the aircraft;
receiving, by the processor, sensor data from the sensor system and navigation data from the navigation system; and
determining, by the processor, the action and recommended timing of performing the action is based on the sensor data and the navigation data.

17. The method of claim 11, further comprising, by the processor:
- monitoring the recommended timing of performing the action relative to the position of the aircraft along the flight plan;
- modifying the first visual element in a first manner to alert a crew of the aircraft when the timing of performing the action relative to a position of the aircraft along the flight plan meets conditions of a preprogrammed first threshold; and
- modifying the first visual element in a second manner to warn the crew of the aircraft when the timing of performing the action relative to the position of the aircraft along the flight plan meets conditions of a preprogrammed second threshold that is different from the first threshold.

18. The method of claim 11, further comprising performing the action, wherein the action includes increasing aerodynamic drag by deploying flaps, applying air brakes, or deploying landing gear of the aircraft.

19. The method of claim 11, wherein the data is received from a flight management system.

20. The method of claim 11, wherein rendering the first visual element includes rendering a flight plan icon representing the flight plan, an ownship icon representing a position of the aircraft along the flight plan, and an action icon representing the action, wherein the action icon is located on the flight plan icon in a position relative to the ownship icon indicating the recommended timing of performing the action.

* * * * *